(12) United States Patent
Lin et al.

(10) Patent No.: US 8,321,609 B2
(45) Date of Patent: Nov. 27, 2012

(54) POWER-SAVING CONTROL CIRCUIT AND METHOD

(75) Inventors: Ming-Chieh Lin, Hsin-Chu County (TW); Hsieh-Yi Wu, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 423 days.

(21) Appl. No.: 11/612,487

(22) Filed: Dec. 19, 2006

(65) Prior Publication Data
US 2008/0126713 A1    May 29, 2008

(30) Foreign Application Priority Data

Sep. 14, 2006   (TW) ............................... 95133979 A (51) Int. Cl.
G06F 3/00 (2006.01)
(52) U.S. Cl. .............................. 710/52; 710/56; 710/310
(58) Field of Classification Search .................... 710/56, 710/52, 310; 365/189.05; 709/234
See application file for complete search history.

(56) References Cited

U.S. PATENT DOCUMENTS

| | | | | |
|---|---|---|---|---|
| 4,486,854 A | * | 12/1984 | Yuni | 711/100 |
| 5,027,330 A | * | 6/1991 | Miller | 365/239 |
| 5,426,756 A | * | 6/1995 | Shyi et al. | 711/159 |
| 5,931,926 A | * | 8/1999 | Yeung et al. | 710/52 |
| 6,052,757 A | * | 4/2000 | Pedicone et al. | 711/108 |
| 6,321,280 B1 | * | 11/2001 | Koike et al. | 710/52 |
| 6,434,640 B1 | * | 8/2002 | Keller | 710/52 |
| 6,658,493 B1 | * | 12/2003 | Fujioka | 710/1 |
| 7,167,943 B2 | * | 1/2007 | Tashiro | 711/103 |
| 7,185,125 B2 | * | 2/2007 | Rougnon-Glasson | 710/52 |
| 7,254,677 B1 | * | 8/2007 | Lowe et al. | 711/118 |
| 7,634,597 B2 | * | 12/2009 | Teng | 710/52 |
| 2004/0158657 A1 | * | 8/2004 | Momtaz et al. | 710/52 |
| 2006/0075162 A1 | * | 4/2006 | Shiraishi | 710/52 |
| 2009/0097340 A1 | * | 4/2009 | Choi | 365/193 |

* cited by examiner

Primary Examiner — Ernest Unelus
(74) Attorney, Agent, or Firm — Jianq Chyun IP Office (57) ABSTRACT

A power-saving control circuit and method suitable for circuits including a first-in-first-out (FIFO) register is provided. In the present invention, a logic circuit is disposed between two circuit modules with data transmitted in between. When there is data input into the FIFO register, the logic circuit activates a clock signal of the circuit module in the receiving end for reading the data. When all the data stored in the FIFO register is read, the clock signal is turned off so that the power consumed by the clock signal is reduced without affecting the data transmitting efficiency and the purpose of power-saving is achieved.

9 Claims, 9 Drawing Sheets

POWER-SAVING CONTROL CIRCUIT AND METHOD

CROSS-REFERENCE TO RELATED APPLICATION

This application claims the priority benefit of Taiwan application serial no. 95133979, filed on Sep. 14, 2006. All disclosure of the Taiwan application is incorporated herein by reference.

BACKGROUND OF THE INVENTION

1. Field of the Invention

The present invention relates to a control circuit, and more particularly, to a power-saving control circuit including a first-in first-out (FIFO) register.

2. Description of Related Art

With the coming of the digital era and the trend for marketing hot multimedia and digital products, consumers have increasing demands on computer specifications. Anything from the speed of circuit operation to the power-saving features and the powering capacity of a battery have become major considerations. However, the price to be paid for increasing the operating speed is often the consumption of more power. As a result, power-saving devices in circuits have become increasingly important. Nowadays, more attention is paid on the development of power-saving devices.

When data is transmitted between interfaces having a different operating speed, a structure including a first-in-first-out (FIFO) register is often used. The hand shaking of data with the FIFO register is mostly achieved through the communication of pointers so that whether the FIFO register contains any data can be determined before data is transmitted or received. More specifically, the FIFO register receives the data from a transmitting end in high speed, stores the data in a memory and waits for a receiving end to read out the data. When the receiving end is free, the receiving end reads out the data in the order which the data is previously stored.

Figure 1A:
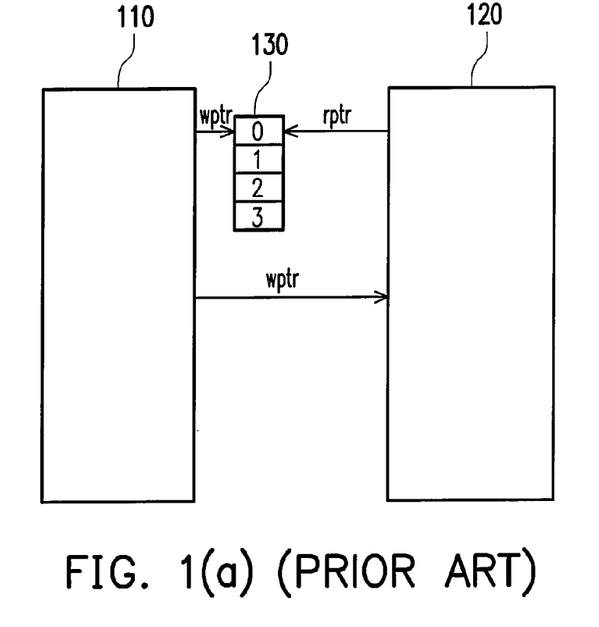

FIG. 1(a) through (e) are diagrams of conventional system structures that use the FIFO register to transmit data. First, as shown in FIG. 1(a), the first circuit module 110 and the second circuit module 120 are modules having different transmission speeds. Data in the first circuit module 110 is transmitted to the second circuit module 120 through the FIFO register 130. Here, a FIFO register 130 with only four record locations is used as an example so that the data transmission process can be explained more easily.

The first circuit module 110 relies on the write pointer (WPTR) to determine which of the record locations of the FIFO register 130 the data is written to. The second circuit module 120 determines to read the data from which of the record locations of the FIFO register 130 through the read pointer (RPTR). When the first circuit module 110 writes data into the FIFO register 130, a write pointer (WPRT) is simultaneously transmitted to the second circuit module 120 so that the second circuit module 120 may know the location where the data is written. When the write pointer and the read pointer are matched, this implies that the FIFO register contains no more data and the second circuit module 120 stops working. On the other hand, when the write pointer is not equal to the read pointer, this implies that the FIFO register still contains unread data and so the second circuit module 120 reads out the data.

Figure 1B:
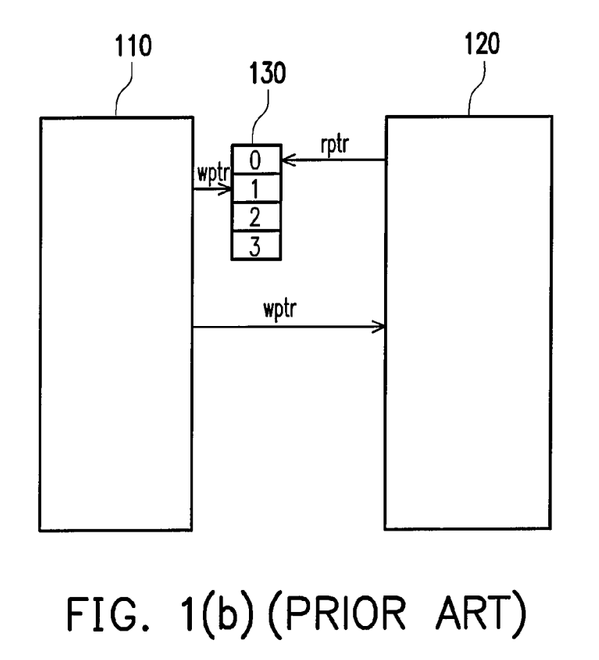
Figure 1C:
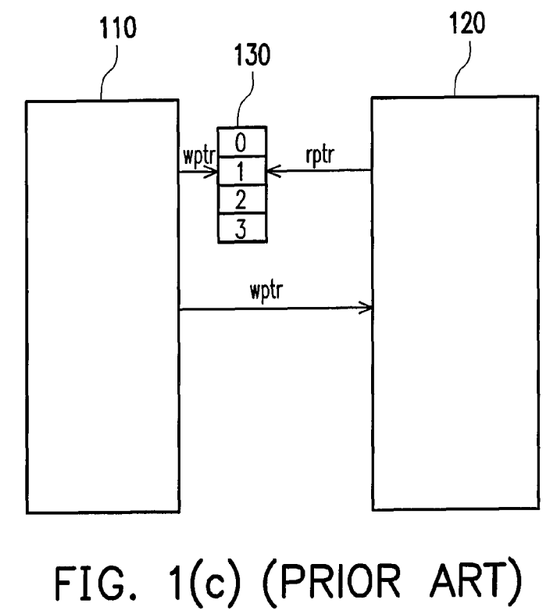

For example, assume that both the write pointer and the read pointer point to the zeroth record location of the FIFO register 130 in the beginning as shown in FIG. 1(a). When the first circuit module 110 needs to write data, the data is written to the location pointed to by the write pointer, that is, the zeroth record location. After the data is written in, the write pointer is directed to the next record location sequentially, that is, the first record location as shown in FIG. 1(b). Meanwhile, the foregoing write pointer is also transmitted to the second circuit module 120. The second circuit module 120 will discover that the record location pointed to by the write pointer is not the same as the record location pointed to by the read pointer. Therefore, the data in the zeroth record location is read out and then the read pointer is renewed to point to the first record location as shown in FIG. 1(c). Because the record location pointed to by the read pointer and the write pointer is the same, reading is stopped.

Figure 1D:
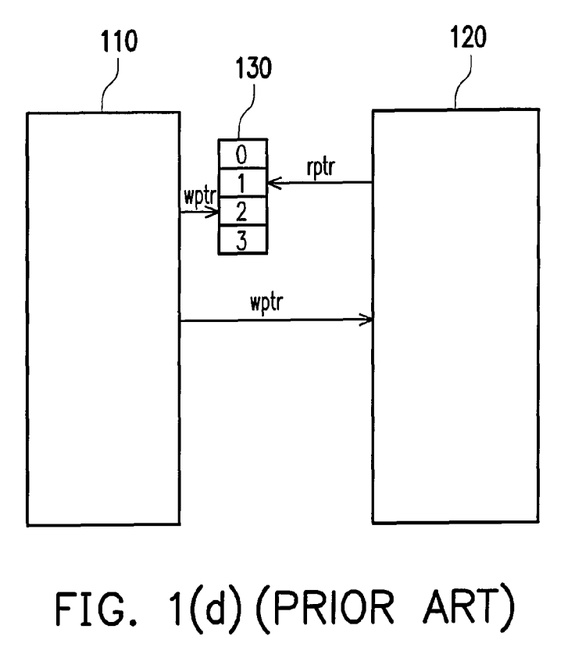
Figure 1E:
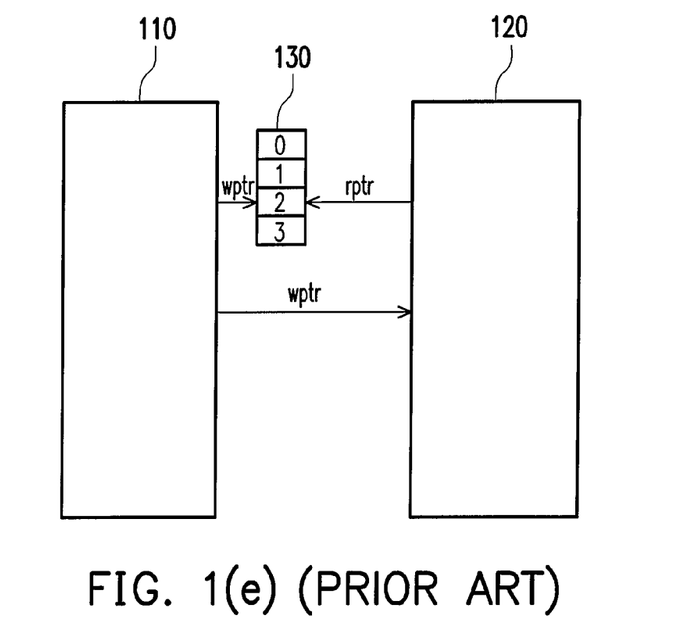

Next, if new data arrives, the data is written to the first record location. After the data is written in, the write pointer automatically points to the second record location as shown in FIG. 1(d). Similarly, the second circuit module 120 will discover that the record location pointed to by the write pointer is not the same as the record location pointed to by the read pointer. Therefore, the data in the first record location is read out and then the read pointer is renewed to point to the second record location as shown in FIG. 1(e). In a similar way, when other data arrives, the foregoing steps are repeatedly executed to transmit data between interfaces having different operating speeds.

However, in the conventional technique, the power saving for operating the FIFO register is not considered. When the first circuit module 110 is linked to the second circuit module 120 to transmit data, the clock signal of the circuit is turned on at all times. Yet, even in the absence of data transmission, the clock signal is still turned on and consumes power continuously. The power thus consumed is a waste of energy. With the rapid advance in technologies, the clock signal is going to operate at a higher frequency so that the power consumed by the clock signal is correspondingly greater and the problem of power wastage becomes more seriously.

Accordingly, the inventor proposes a power-saving control circuit and method suitable for circuits including a FIFO register to revolve the foregoing problem.

SUMMARY OF THE INVENTION

Accordingly, the present invention is directed to a power-saving control circuit that utilizes a logic circuit to determine whether any unread data remains within a first-in-first-out (FIFO) register such that the clock signal at a receiving end is controlled to save power.

The present invention provides a power-saving control method that turns off clock signal at a receiving end of a circuit module to avoid unnecessary power consumption after all the data stored in a FIFO register has been read.

To achieve these and other advantages and in accordance with the purpose of the invention, as embodied and broadly described herein, the invention provides a power-saving control circuit. The circuit includes a first-in-first-out (FIFO) register, a first circuit module, a second circuit module and a logic circuit. The FIFO register includes a plurality of record locations suitable for storing a plurality of data into the foregoing record locations according to their writing sequence. The first circuit module is coupled to the FIFO register for writing data into the record locations of the FIFO register and generating a plurality of write pointers, wherein the write pointer corresponds to the record location of the last written data. The second circuit module is coupled to the first circuit module and the FIFO register for sequentially reading out the data stored in the FIFO register according to the write pointer outputted from the first circuit module. The logic circuit is coupled to the first circuit module and the second circuit module for receiving the write pointer and generating a plurality of read flags. According to the read flags, the clock signal of the second circuit module is turned on to read the data stored in the FIFO register. Simultaneously, the logic circuit also receives a plurality of read ended signals returned from the second circuit module to clear the read flags and turn the clock signal of the second circuit module off.

According to one preferred embodiment of the present invention, the foregoing logic circuit includes a plurality of flip-flops and an OR gate. Each flip-flop corresponds to a record location of the FIFO register and generates a read flag on receiving the write pointer. The OR gate is coupled to the flip-flops for receiving the read flags from the flip-flops and outputting a read enable signal to the second circuit module for controlling the second circuit module to turn on the clock signal.

According to one preferred embodiment of the present invention, the second circuit module will return the read ended signal to the flip-flop after the second circuit module has read the data in the record location. After the flip-flop has received the read ended signal, the write pointer is cleared. When all the write pointers are cleared, the OR gate will output a read disable signal and turn off the clock signal of the second circuit module.

The present invention also provides a power-saving control method that includes the following steps. First, the first circuit module writes data to the record location of the FIFO register. Simultaneously, the first circuit module generates a write pointer corresponding to the record location and outputs the write pointer to the second circuit module and the logic circuit. Then, the logic circuit generates a read flag that corresponds to the write pointer and outputs a read enable signal to the second circuit module. After that, the second circuit module turns on the clock signal, and starting from the record location pointed to by a read pointer, the data in the record location corresponding to the write pointer are sequentially read from the FIFO register. After reading all the data, the second circuit module returns a read ended signal to the logic circuit. Next, the logic circuit clears the read flag and outputs a read disable signal to the second circuit module to turn off its clock signal.

According to one preferred embodiment of the present invention, the first circuit module further includes sequentially writing batches of data to the plurality of record locations in the FIFO register, and generating the write pointer corresponding to the record location of the last written data. The logic circuit includes receiving the write pointer and correspondingly generating a plurality of read flags. Then, the logic circuit outputs the read enable signal to the second circuit module according to the read flags. The logic circuit will output a read enable signal if it receives one write pointer. After the second circuit module has received the read enable signal, the clock signal is turned on and the data in the record location pointed to by the read pointer is sequentially read. Whenever a complete batch of data has been read, the second circuit module returns a read ended signal to the logic circuit so that the logic circuit can clear the corresponding read flags. In addition, the logic circuit also includes determining whether all the read flags are cleared. If all the read flags are cleared, then the logic circuit outputs a read disable signal to the second circuit module to turn off the clock signal.

Accordingly, the present invention utilizes the logic circuit to control the activation of the clock signal of the circuit module to read the data in the FIFO register. When all the stored data has been read, the clock signal of the circuit module is turned off so that the power consumption is reduced. Ultimately, the power-saving control method using the logic circuit in the present invention can save a lot of power of a circuit including a FIFO register.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1($a$) through ($e$) are diagrams of conventional system structures that uses the FIFO register to transmit data.

FIGS. 4($a$) through ($e$) are diagrams showing a power-saving control circuit operating in a single batch data transmission mode according to one preferred embodiment of the present invention.

FIGS. 5($a$) through ($d$) are diagrams showing a power-saving control circuit operating in a multiple batch data transmission mode according to one preferred embodiment of the present invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In the following embodiments, when a device is indicated as 'connected' or 'coupled' to another device, it means the first device is directly connected or coupled to the second device, or other devices may be disposed between the two devices. In contrast, when the device is indicated as 'directly connected' or 'directly coupled' to another device, it means that no other device is disposed between the two devices.

To provide a better understanding of the content of the present invention, embodiments are given in the following to serve as examples showing the practicality of the present invention.

Figure 2:
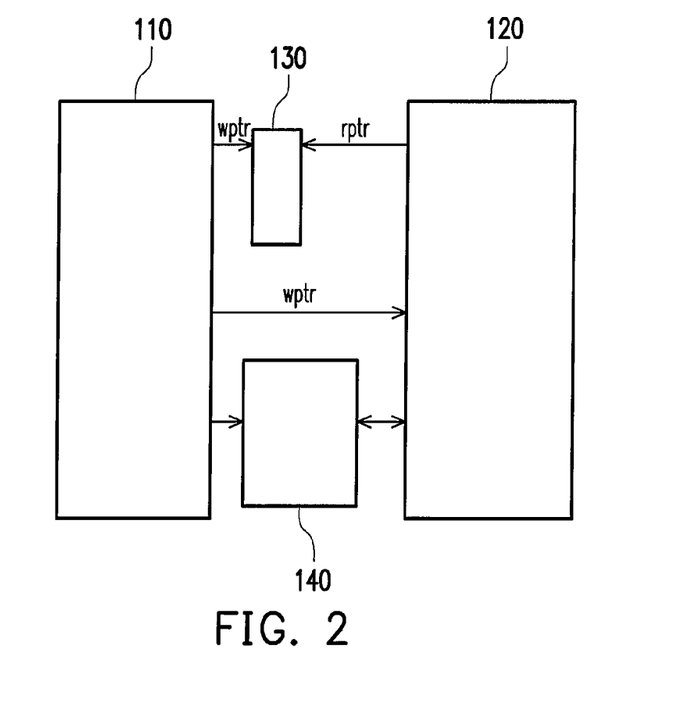
FIG. 2 is a diagram showing a structure of a power-saving control circuit system according to one preferred embodiment of the present invention.

FIG. 2 is a diagram showing a structure of a power-saving control circuit system according to one preferred embodiment of the present invention. As shown in FIG. 2, the power-saving control circuit in the present embodiment includes a first-in-first-out (FIFO) register 130, a first circuit module 110, a second circuit module 120 and a logic circuit 140. The FIFO register 130 is divided into a plurality of memory areas with each memory area having corresponding record locations such that data can be stored in the record locations according to the writing sequence of the data.

The first circuit module 110 is coupled to the FIFO register 130. When the first circuit module 110 needs to transmit data to the second circuit module 120, the data is written to a record location of the FIFO register 130 and a write pointer is generated and output to the second circuit module 120 and the logic circuit 140. The write pointer corresponds to the record location of the last written data.

The second circuit module 120 is coupled to the first circuit module 110 and the FIFO register 130. The data stored in the FIFO register 130 is sequentially read according to the write pointer from the first circuit module 110.

The logic circuit 140 is coupled to the first circuit module 110 and the second circuit module 120 for receiving the write pointer from the first circuit module 110 to generate a plurality of read flags. The clock signal of the second circuit module 120 is turned on to read the data in the FIFO register 130 according to these read flags. In addition, the logic circuit 140 also receives the plurality of read ended signals returned by the second circuit module 120 to clear the read flags and turn off the clock signal of the second circuit module 120.

In one preferred embodiment of the present invention, the logic circuit 140 may further include a plurality of flip-flops and an OR gate. Each flip-flop is coupled to the first circuit module 110 and corresponds to a record location of the FIFO register 130. Furthermore, each flip-flop may receive the write pointer of the first circuit module 110. After receiving the write pointer, the flip-flop generates a read flag. The input terminals of the OR gate are respectively coupled to the output terminals of the flip-flops, and the output terminal of the OR gate is coupled to the second circuit module 120. The OR gate is suitable for receiving the read flags from the flip-flops. The OR gate outputs a read enable signal to the second circuit module 120 for controlling the second circuit module 120 to turn on the clock signal according to the read flags.

Figure 3:
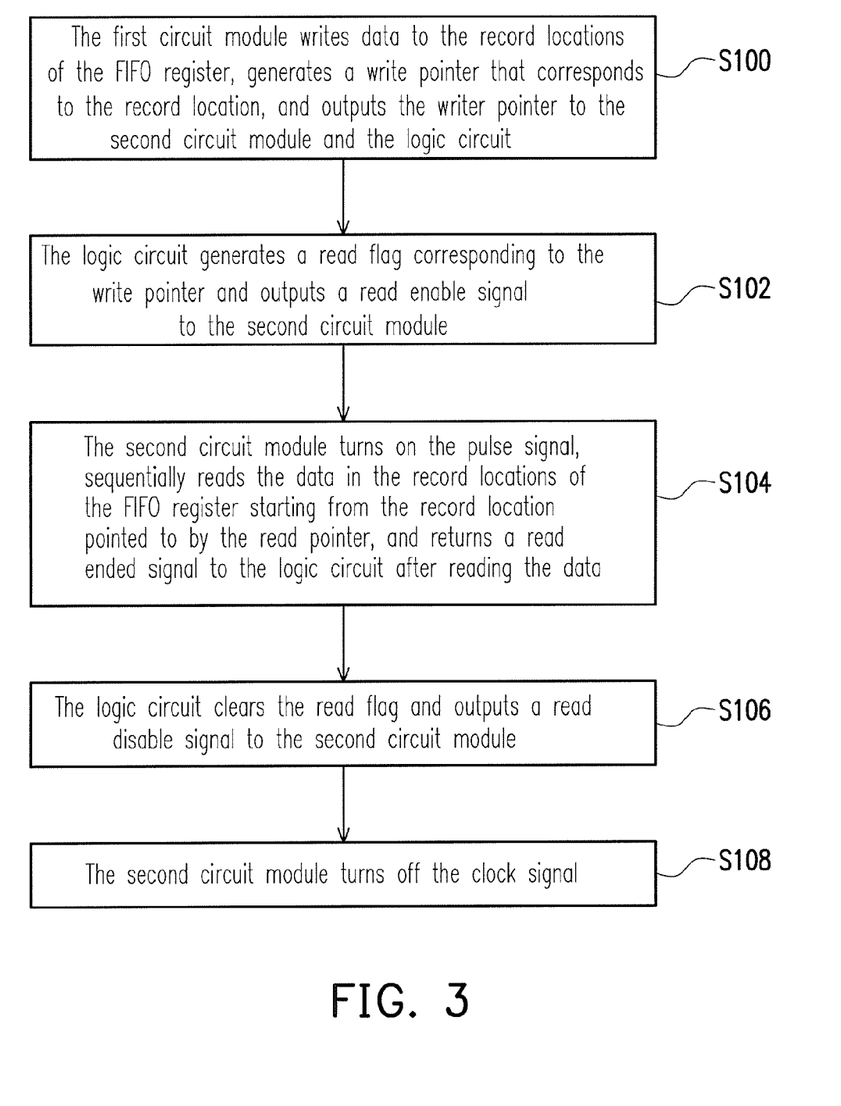
FIG. 3 is a flow diagram showing steps in a power-saving control method according to one preferred embodiment of the present invention.

FIG. 3 is a flow diagram showing steps in a power-saving control method according to one preferred embodiment of the present invention. Referring to FIGS. 2 and 3, the steps are as follows.

When the first circuit module 110 needs to transmit data to the second circuit module 120, the data is sequentially written to the FIFO register 130 through the write pointer. The FIFO register 130 sequentially stores the data in the memory areas corresponding to the record locations according to the writing sequence. After storing the data, the write pointer will automatically point to the next record location. The first circuit module 110 renews the write pointer and outputs the write pointer to the second circuit module 120 and the logic circuit 140 according to the record location of the last written data (step S100).

When the logic circuit 140 receives write pointers, it generates corresponding read flags. The logic circuit 140 is able to determine whether the FIFO register 130 contains any unread data according to the read flags. If there is unread data in the FIFO register 130, the logic circuit 140 outputs a read enable signal to the second circuit module 120 for turning on the clock signal of the second circuit module 120 to read the data from the FIFO register 130 (step S102).

When the clock signal of the second circuit module 120 is turned on, the second circuit module 120 determines which of the record locations in the FIFO register 130 contains new unread data according to the write pointer outputted from the first circuit module 110. Then, starting from the record location pointed to by the self-generated read pointer, the second circuit module 120 sequentially read the data stored in the FIFO register 130. After all the data is read, the second circuit module 120 returns a read ended signal to the logic circuit 140 (step S104).

After the second circuit module 120 has completed reading the data from a record location, it returns a read ended signal to the logic circuit 140 to clear the read flag that corresponds to this record location. In the meantime, the logic circuit 140 will output a read disable signal to the second circuit module 120 (step S106).

When the second circuit module 120 receives the read disable signal, the clock signal of the second circuit module 120 is turned off (step S108). Under the same token, the clock signal of the second circuit module 120 is turned on to read data only when written data is available. Conversely, when the second circuit module 120 has finished reading all the data, the clock signal is turned off to save power.

It should be noted that when the first circuit module 110 writes multiple batches of data to the FIFO register 130, multiple batches of corresponding triggering signals are generated and transmitted to the logic circuit 140 for generating a number of read flags. Then, the logic circuit 140 outputs a read enable signal to the second circuit module 120 to turn on the clock signal of the second circuit module 120 and read the data. After the second circuit module 120 has finished reading data, it generates triggering signals to clear the corresponding read flags in the logic circuit 140. When all the read flags have been cleared, the logic circuit 140 will output a read disable signal (a logic '0') to turn off the clock signal of the second circuit module 120.

Figure 4A:
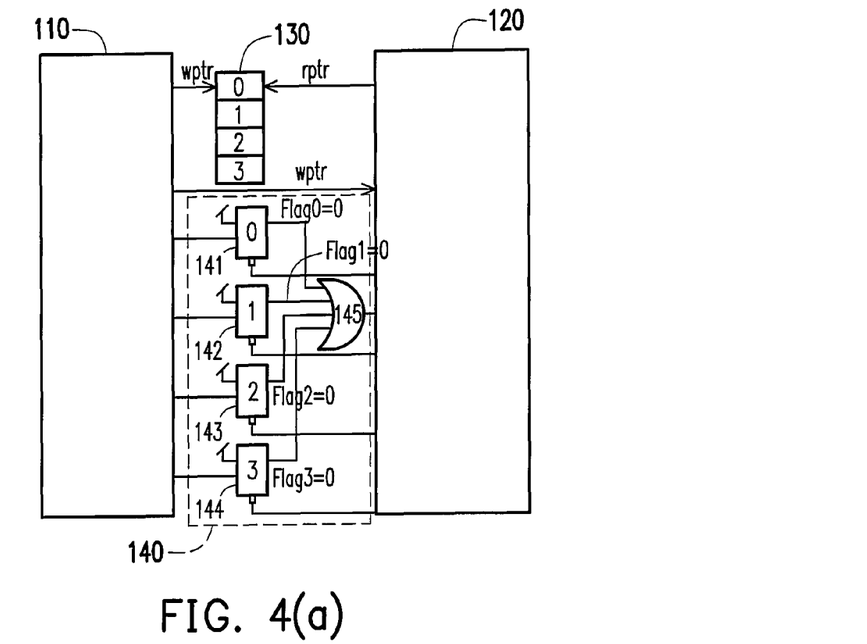

A detailed description of the signals and data transmitted between various devices in a control circuit when transmitting a signal batch data is provided as follows. FIGS. 4(a) through (e) are diagrams showing a power-saving control circuit when transmitting a single batch data according to one preferred embodiment of the present invention. As shown in FIG. 4(a), in the present embodiment, both the write pointer of the first circuit module 110 and the read pointer of the second circuit module 120 are assumed to point to the zeroth record location initially. Moreover, all the read flags flag0, flag1, flag2, flag3 of the flip-flops are set as logic '0'. Here, the flag0 represents the output signal of the zeroth flip-flop 141; the flag1 represents the output signal of the first flip-flip 142, and so on. The logic circuit 140 includes four flip-flops 141, 142, 143, 144 and an OR gate 145. Each of the flip-flops corresponds to a record location of the FIFO register 130. In other words, the zeroth flip-flop 141 corresponds to the zeroth record location; the first flip-flop 142 corresponds to the first record location, and so on.

When the first circuit module 110 needs to transmit a batch of data to the second circuit module 120, the data is first written to the zeroth record location of the FIFO register 130. Meanwhile, the write pointer of the first circuit module 110 is accordingly changed so that it points to the first record location. Then, the write pointer is transmitted to both the second circuit module 120 and the logic circuit 140.

Figure 4B:
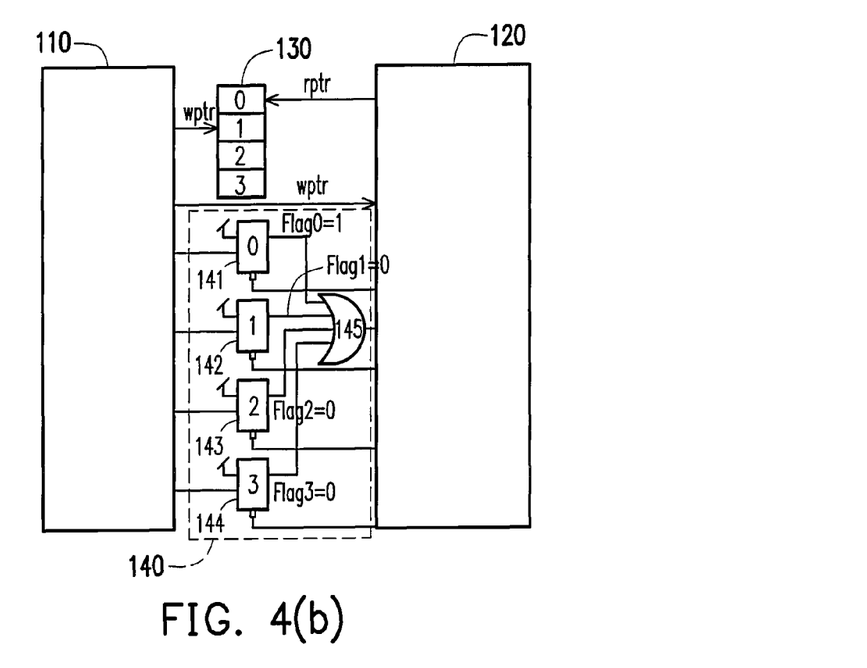

The zeroth flip-flop 141 of the logic circuit 140 receives the write pointer outputted from the first circuit module 110 and generates a corresponding read flag (logic '1'). Thus, the logic circuit 140 knows that the zeroth record location has unread data. Therefore, the OR gate 145 outputs a read enable signal (logic '1') to the second circuit module 120 so that the clock signal of the second circuit module 120 is turned on. Then, the second circuit module 120 reads the data in the zeroth record location as shown in FIG. 4(b) according to the record location pointed to by its own read pointer.

Figure 4C:
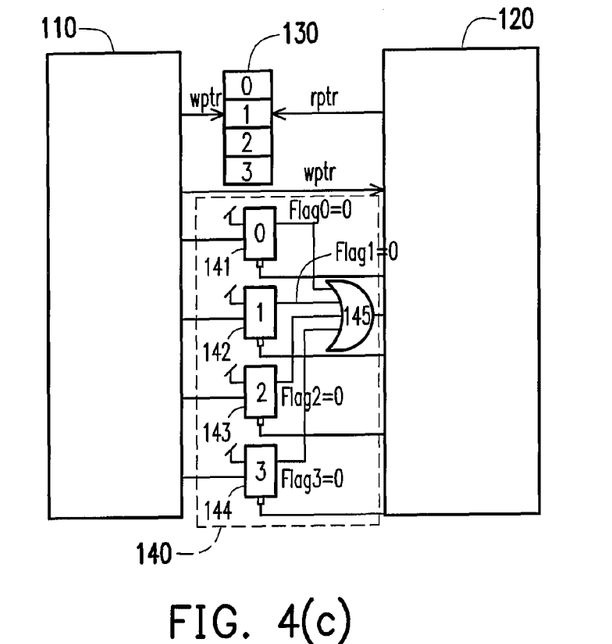

After the second circuit module 120 has read out the data stored in the zeroth record location, the read pointer is shifted to the first record location and transmits a triggering signal to the zeroth flip-flop 141 to clear flag0. Meanwhile, the OR gate 145 immediately outputs a corresponding read disable signal (logic '0') to the second circuit module 120 so that the clock signal of the second circuit module 120 is turned off. Hence, the circuit module 120 no longer consumes any power as shown in FIG. 4(c).

Figure 4D:
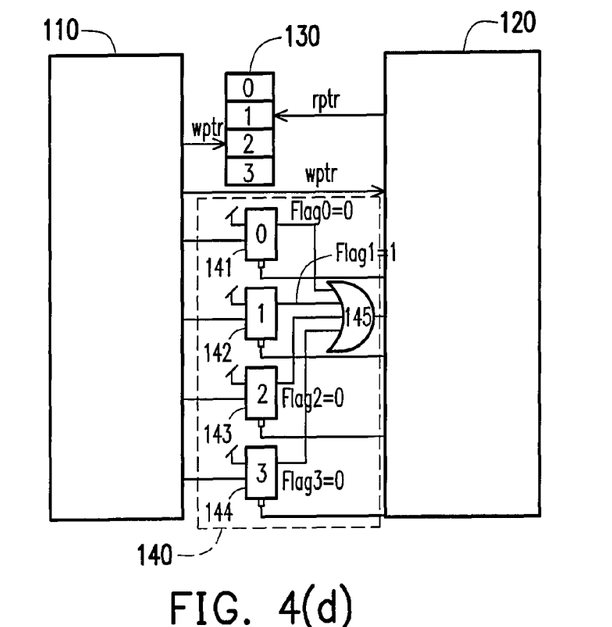

Next, when new data arrives, the first circuit module 110 will fill the data into the first record location of the FIFO register 130 and then the write pointer is changed to point to the second record location. Meanwhile, the first circuit module 110 also outputs the write pointer to the second circuit module 120 and simultaneously transmits a triggering signal to the first flip-flop 142 for generating a read flag flag1 (logic '1'). Similarly, the logic circuit 140 outputs a read enable signal through the OR gate 145 for turning on the clock signal of the second circuit module 120 as shown in FIG. 4(d).

Figure 4E:
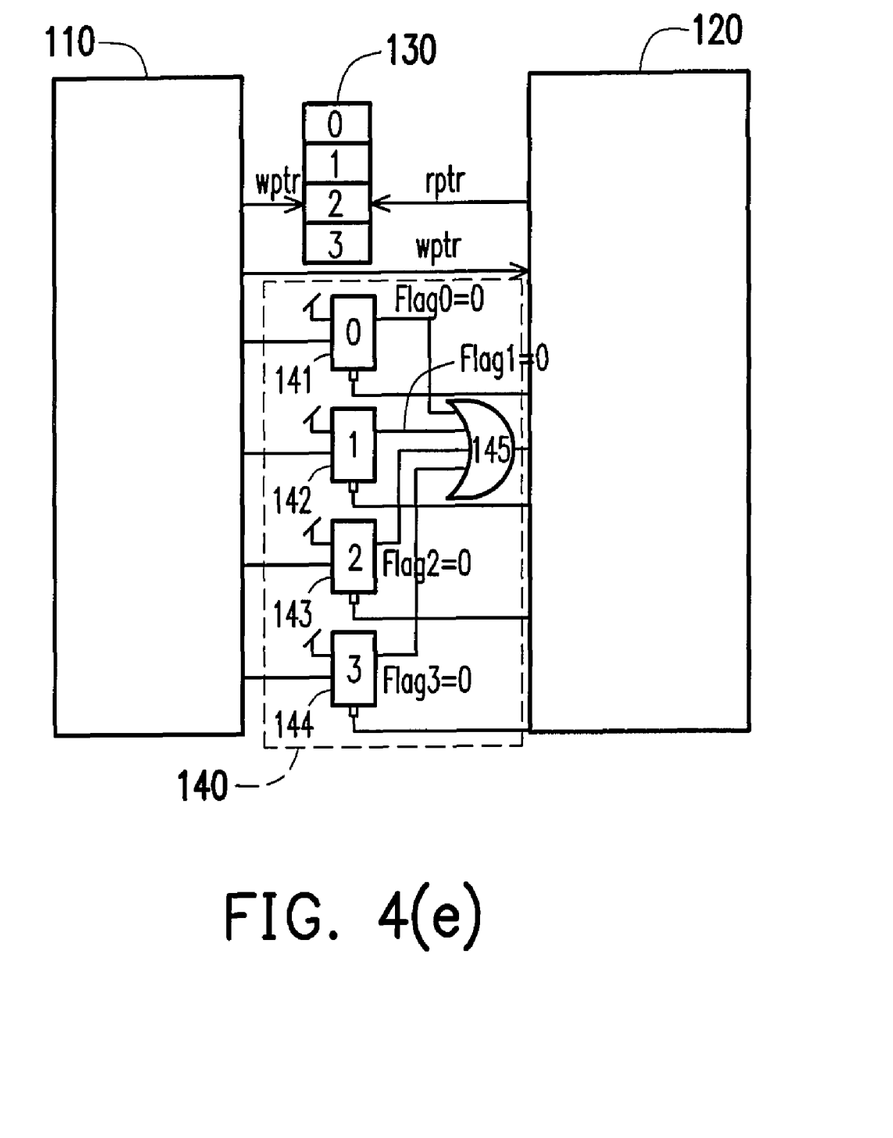

The second circuit module 120 reads out the data stored in the first record location according to the record location pointed to by the read pointer. After reading the data, the read pointer is directed to the second record location and transmits a triggering signal to the first flip-flop 142 to clear flag1. Meanwhile, the OR gate 145 immediately outputs a read disable signal so that the clock signal of the second circuit module 120 is turned off as shown in FIG. 4 (e). Under the same token, the clock signal of the second circuit module 120 is turned on to read data only when written data is available. Conversely, when the second circuit module 120 has completed reading all the data, the clock signal is turned off to save power.

Figure 5A:
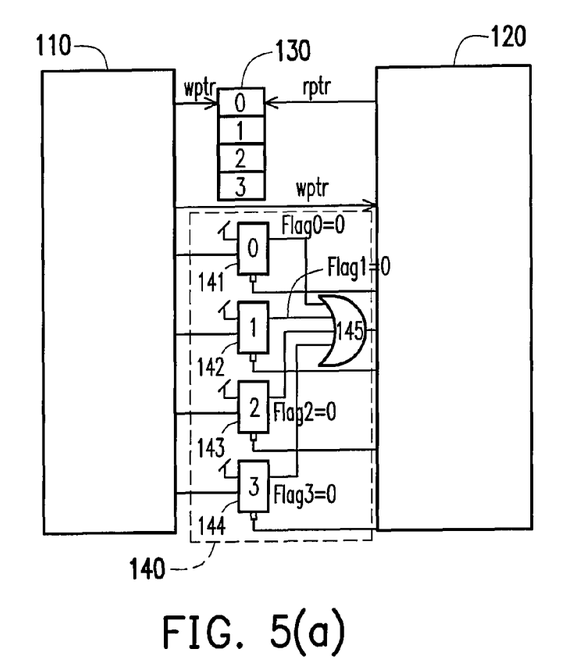

In the following, another embodiment is used to explain the signal and data transmission between the devices in the present invention when multiple batches of data are transmitted simultaneously. FIGS. 5(a) through (d) are diagrams showing a power-saving control circuit operating in a multiple batch data transmission mode according to one preferred embodiment of the present invention. As shown in FIG. 5(a), in the present embodiment, both the write pointer of the first circuit module 110 and the read pointer of the second circuit module 120 are assumed to point to the zeroth record location initially. Moreover, all the read flags flag0, flag1, flag2, flag3 of the flip-flops are set as logic '0'. Here, the flag0 represents the output signal of the zeroth flip-flop 141, the flag1 represent the output signal of the first flip-flop 142, and so on. The logic circuit 140 includes four flip-flops 141, 142, 142, 144 and an OR gate 145. Each of the flip-flops corresponds to a record location of the FIFO register 130. In other words, the zeroth flip-flop 141 corresponds to the zeroth record location; the first flip-flop 142 corresponds to the first record location, and so on.

It is assumed that the first circuit module 110 needs to transmit two batches of data to the second circuit module 120, and then the first circuit module 110 will sequentially write the data to the zeroth record location and the first record location of the FIFO register 130. Meanwhile, the write pointer of the first circuit module 110 is shifted to the second record location and the write pointer is outputted to the second circuit module 120 and the logic circuit 140.

Figure 5B:
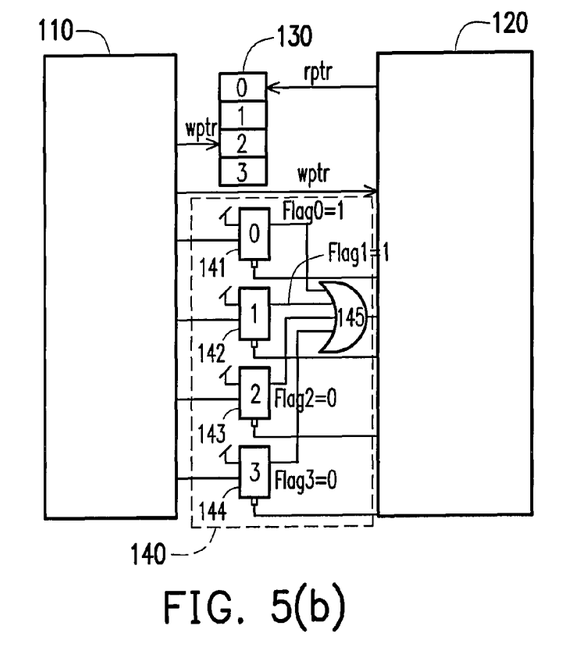

The zeroth flip-flop 141 and the first flip-flop 142 of the logic circuit 140 receive the write pointers from the first circuit module 110. Thus, the logic circuit 140 knows that the zeroth record location and the first record location contain unread data. Therefore, when the zeroth flip-flop 141 and the first flip-flop 142 receive the write pointers, they will correspondingly generate a read flag (logic '1') and output them to the OR gate 145. Then, the OR gate 145 outputs a read enable signal to the second circuit module 120 to turn on the clock signal and read the data from the FIFO register 130 as shown in FIG. 5(b).

Figure 5C:
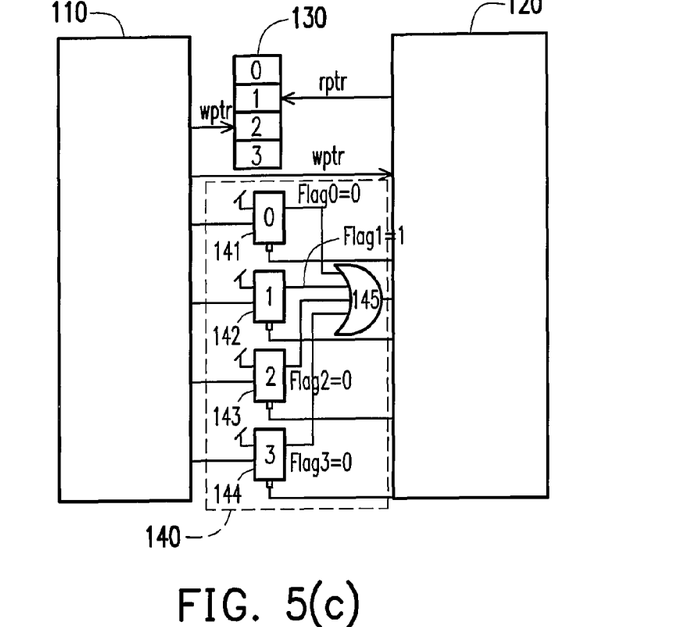

When the clock signal of the second circuit module 120 is turned on, the second circuit module 120 will compare the write point outputted from the first circuit module 110 with it own read pointer to learn that the zeroth record location and the first record location of the FIFO register 130 contain new and unread data. Then, starting from the record location pointed to by the self-generated read pointer, the data stored in the zeroth record location and the first record location of the FIFO register 130 are sequentially read. After the second circuit module has finished reading the data in the zeroth record location, the read pointer is shifted to the first memory location. Simultaneously, a read ended signal is returned to the zeroth flip-flop 141 of the logic circuit 140 to clear the read flag (logic '0') corresponding to this record location as shown in FIG. 5(c).

Figure 5D:
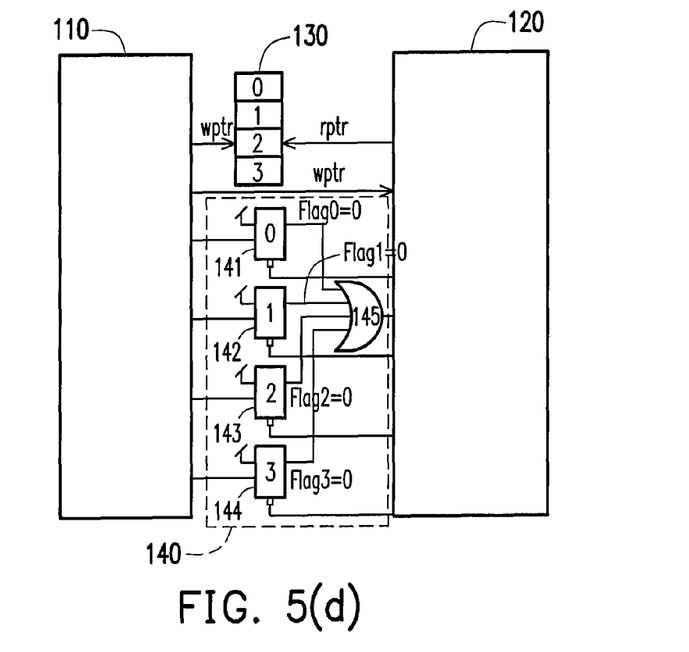

After the second circuit module 120 has finished reading the data in the first record location, the read pointer is shifted to the second memory location. Simultaneously, a read ended signal is returned to the first flip-flop 142 of the logic circuit 140 to clear the read flag (logic '0') corresponding to this record location as shown in FIG. 5(d). Meanwhile, since the read flag of both flip-flops are cleared, the OR gate 145 outputs a read disable signal (logic '0') to turn off the clock signal of the second circuit module 120. Under the same token, the clock signal of the second circuit module 120 is turned on to read data only when there is data written in. Conversely, when the second circuit module 120 has finished reading all the data, the clock signal is turned off to save power.

In summary, the present invention controls the switching of the clock signal of the second circuit module mainly through the flip-flops and the OR gate of the logic circuit. Hence, not only the power wastage are minimized, but the record location of the data to be read by the second circuit module can be readily determined. Therefore, the power-saving control circuit and method of the present invention is quite effective in saving the power in circuits including a FIFO register.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A register control circuit, comprising:
 a first-in-first-out (FIFO) register, having a plurality of record locations and storing a plurality of data into the record locations according to a writing sequence of the data;
 a first circuit module, coupled to the FIFO register, writing data in the record locations of the FIFO register, and generating and outputting a plurality of write pointers, wherein one of the write pointers corresponds to a record location of a last written data;
 a second circuit module, coupled to the first circuit module and the FIFO register, receiving the write pointers, and sequentially reading the data stored in the FIFO register according to the write pointers outputted from the first circuit module; and
 a logic circuit, coupled to the first circuit module and the second circuit module, receiving the write pointers and generating a plurality of read flags, and according to the read flags, turning on a pulse signal of the second circuit module to read the data stored in the FIFO register, and simultaneously receiving a plurality of read ended signals returned from the second circuit module to clear the read flags, wherein when the logic circuit turns on the pulse signal of the second circuit module, the second circuit module reads the data stored in the FIFO register, when the second circuit module has read the data stored in the FIFO register completely, all of the read flags are cleared, and then the logic circuit turns off the pulse signal of the second circuit module until the first circuit module writes new data in the record locations of the FIFO register, wherein the logic circuit comprises:

a plurality of flip-flops, each of the flip-flops receiving one of the write pointers outputted from the first circuit module and generating the read flag when receiving the write pointer, wherein the write pointer points to one of the record locations in the FIFO register; wherein each of the flip-flops corresponds to one of the record locations of the FIFO register; and an OR gate, coupled to the flip-flops, receiving the read flags outputted from the flip-flops to generate the read enable signal according to states of the read flags, and outputting the read enable signal to the second circuit module so that the pulse signal of the second circuit module is turned on.

2. The register control circuit of claim 1, wherein the second circuit module returns the read ended signal to the flip-flops after the data of the record location is read.

3. The register control circuit of claim 2, wherein the flip-flops clear the read flags after receiving the read ended signals.

4. The register control circuit of claim 3, wherein the logic circuit outputs a read disable signal to turn off the pulse signal of the second circuit module after all the read flags are cleared.

5. A register control method of transmitting data from a first circuit module to a second circuit module through a first-in-first-out (FIFO) register using a logic circuit, the register control method comprising the steps of:

the first circuit module writes the data to a record location in the FIFO register, generates a write pointer corresponding to the record location, and outputs the write pointer to the second circuit module and the logic circuit;

when the logic circuit receives the write pointer, the logic circuit generates a read flag corresponding to the write pointer and outputs a read enable signal to the second circuit module;

when the second circuit module receives the read enable signal and the write pointer, the second circuit module turns on a pulse signal, sequentially reads the data in the record location of the FIFO register starting from the record location pointed to by a read pointer according to the write pointer outputted from the first circuit module, and returns a read ended signal to the logic circuit after the second circuit module reading the data stored in the FIFO register completely when the logic circuit turns on the pulse signal of the second circuit module and simultaneously receives the read ended signal returned from the second circuit module to clear the read flag;

when the logic circuit receives the read ended signal, the logic circuit clears the read flag and outputs a read disable signal to the second circuit module; and when the second circuit module receives the read disable signal, the second circuit module turns off the pulse signal until the first circuit module writes new data in the record locations of the FIFO register, wherein the first circuit module further comprises sequentially writing a plurality of data to a plurality record locations of the FIFO register and generating a write pointer corresponding to a record location of the data last written in; and wherein the logic circuit comprises a plurality of flip-flops and an OR gate, each of the flip-flops receiving the write pointer outputted from the first circuit module and generating the read flag when receiving the write pointer, wherein the write pointer points to one of the record locations in the FIFO register, and the OR gate receives the read flags outputted from the flip-flops to generate the read enable signal according to states of the read flags and outputs the read enable signal to the second circuit module so that the pulse signal of the second circuit module is turned on, wherein each of the flip-flops corresponds to one of the record locations of the FIFO register.

6. The register control method of claim 5, wherein the logic circuit immediately outputs the read enable signal when the logic circuit generates one of the read flags.

7. The register control method of claim 5, wherein the second circuit module turns on the pulse signal after receiving the read enable signal and sequentially reads the data in the record locations pointed to by the read pointer.

8. The register control method of claim 7, wherein the second circuit module immediately returns the read ended signal to the logic circuit after reading one of the data, and then the logic circuit clears the corresponding read flag.

9. The register control method of claim 8, wherein the logic circuit comprises determining whether all the read flags are cleared or not, and if all the read flags are cleared, the logic circuit outputs the read disable signal to the second circuit module to turn off the pulse signal.

* * * * *